United States Patent
Fischer

(10) Patent No.: US 7,823,160 B2
(45) Date of Patent: Oct. 26, 2010

(54) METHODS OF FORWARDING CONTEXT DATA UPON APPLICATION INITIATION

(75) Inventor: Ilja Fischer, Heidelberg (DE)

(73) Assignee: SAP Aktiengesellschaft, Walldorf ( * ) Notice: Subject to any disclaimer, the term of this patent is extended or adjusted under 35 U.S.C. 154(b) by 1602 days.

(21) Appl. No.: 11/100,875

(22) Filed: Apr. 7, 2005

(65) Prior Publication Data

US 2006/0230359 A1 Oct. 12, 2006

(51) Int. Cl.
G06F 3/00 (2006.01)
G06F 17/30 (2006.01)

(52) U.S. Cl. .................. 719/311; 719/312; 707/722

(58) Field of Classification Search .......... 719/312, 719/314, 319, 320, 330, 311; 711/1–4; 715/273, 715/741, 742, 854; 709/221; 707/101–104.1, 707/722
See application file for complete search history.

(56) References Cited

U.S. PATENT DOCUMENTS

| | | | | | |
|---|---|---|---|---|---|
| 5,448,739 | A | * | 9/1995 | Jacobson | 719/320 |
| 6,628,314 | B1 | * | 9/2003 | Hoyle | 715/854 |
| 6,785,671 | B1 | * | 8/2004 | Bailey et al. | 707/3 |
| 7,152,231 | B1 | * | 12/2006 | Galluscio et al. | 719/312 |
| 7,366,996 | B2 | * | 4/2008 | Hoyle | 715/854 |
| 2001/0034786 | A1 | * | 10/2001 | Baumeister et al. | 709/231 |
| 2006/0140162 | A1 | * | 6/2006 | Vasa | 370/338 |
| 2007/0276841 | A1 | * | 11/2007 | Rhoads et al. | 707/10 |

OTHER PUBLICATIONS

DCE 1.2.2 Public Key Login—Functional Specification [online]. Open Software Foundation, Feb. 1996, [retrieved on Mar. 3, 2005]. Retrieved from the Internet: <URL: http://www.opengroup.org/tech/rfc/rfc68.2.html>.
Project: Linux Scalability Effort: Document Manager: Display I [online]. OSTG Open Source Technology Group, 2005, [retrieved on Mar. 3, 2005]. Retrieved from the Internet: <URL: http://sourceforge.net/docman/display_doc.php?docid=12548&group_id=8875>.
Terms and Conditions for Use of SAPmats [online]. SAP [retrieved on Mar. 2, 2005]. Retrieved from the Internet: <URL: http://sapmats-de.sap-ag.de/terms.html>.
Tanenbaum, Andrew S., et al., "Communication" (Chap. 2) in: *Distributed Systems Principles and Paradigms* (New Jersey, Prentice Hall, 2002), pp. 57-134.

* cited by examiner

*Primary Examiner*—Hyung S Sough
*Assistant Examiner*—Phuong N Hoang
(74) *Attorney, Agent, or Firm*—Fish & Richardson P.C.

(57) ABSTRACT

A method to be performed in a computer system having a function for initiating applications that allows context data to be forwarded to the initiated application in a character string includes receiving a user input made during execution of a first application. The user input requests a specific operation to be performed by a second application, the specific operation to be performed using context data from the first application. In response to the user input, the context data is stored in a memory location that is available during execution of the second application. A character string is forwarded to the second application upon its initiation, the character string including an address of the memory location, wherein the second application is to access the context data for performing the specific operation. The first application or a portal store the context data, initiate the second application and forward the character string.

15 Claims, 4 Drawing Sheets

METHODS OF FORWARDING CONTEXT DATA UPON APPLICATION INITIATION

TECHNICAL FIELD

The description relates to forwarding context data to an application upon its initiation.

BACKGROUND

Many computer systems are configured to allow a user to navigate from one application to another. This navigation may be triggered in different ways. In some systems, the user selects an object in the first application and the system thereafter selects another application as the correct one for performing a specific operation.

Some systems can forward context data to the initiated application. The context data is to be used in performing the specific operation for which the application was initiated. The system may forward the context data in form of a character string that is received and parsed by the initiated application. The forwarded context data does not include any complex data objects because it consists of a string of characters. Moreover, the system may significantly limit the number of characters that can be included in the string.

SUMMARY

The invention relates to forwarding context data.

In a first general aspect, the invention provides a method to be performed in a computer system having a function for initiating applications that allows context data to be forwarded to the initiated application in a character string. The method comprises receiving a user input made during execution of a first application, the user input requesting a specific operation to be performed by a second application. The specific operation is to be performed using context data from the first application. The method comprises storing, in response to the user input, the context data in a memory location that is available during execution of the second application. The method comprises forwarding a character string to the second application upon its initiation, the character string including an address of the memory location, wherein the second application is to access the context data for performing the specific operation.

In selected embodiments, the user input indicates a user selection of a table entry in the first application and the context data comprises data from the selected table entry. The computer system may include a portal and several applications, and the portal may identify, upon the user input being received, the second application from the several applications. The portal may identify the second application as being associated with an object on which the specific operation is to be performed. The first application may provide the context data to the portal upon the user input being received and the portal may trigger the storing of the context data in the memory location. The portal may trigger the initiation of the second application. The portal may forward an identity of the second application to the first application and the first application may trigger the initiation of the second application. The first application may trigger the storing of the context data in the memory location. The second application may parse the character string, read the address and use the address to access the context data.

In a second general aspect, the invention provides a computer system comprising: several applications that can be executed for performing operations, a function for initiating any of the several applications, the function allowing context data to be forwarded to the initiated application in a character string, and a portal that, upon receipt of a user input made during execution of a first application, identifies a second application from the several applications for a specific operation requested by the user input, the second application to perform the specific operation using context data from the first application. A character string is forwarded to the second application upon its initiation, the character string including an address of a memory location where the context data is stored, the second application to use the address in accessing the context data for performing the specific operation.

In selected embodiments, the user input indicates a user selection of a table entry in the first application and the context data comprises data from the selected table entry. The portal may identify the second application as being associated with an object on which the specific operation is to be performed. The first application may provide the context data to the portal upon the user input being received and the portal may trigger the storing of the context data in the memory location. The portal may trigger the initiation of the second application using the function. The portal may forward an identity of the second application to the first application and the first application may trigger the initiation of the second application using the function. The first application may trigger the storing of the context data in the memory location. The second application may parse the character string, read the address and use the address to access the context.

Advantages of the systems and techniques described herein may include any or all of the following: Providing an improved transmission of context data to an application upon its initiation; providing that a context data-transmission function can be used in transmitting complex or extensive context data; providing flexible distribution of tasks between a portal and a first application regarding transmission of context data and initiation of a second application.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
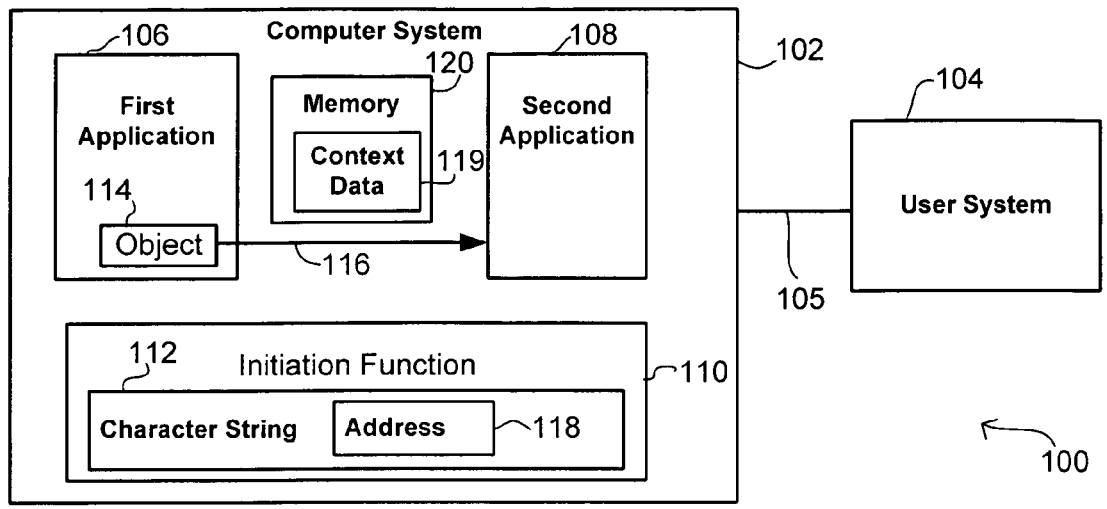
FIG. 1 schematically shows an example of a system that forwards context data upon initiation of an application.

FIG. 1 shows an exemplary system 100 that forwards context data upon initiation of an application. The system 100 includes a computer system 102 and a user system 104 joined by any connection 105, such as a computer network. For example, the computer system 102 is a server device and the user system 104 is a client device.

The computer system 102 includes at least a first application 106 and a second application 108. The applications are embodied in computer-readable code that the system can execute to perform various operations in the system. Particularly, when an application is initiated to perform a specific operation, the system may forward context data to the initiated application for use in performing the operation.

The computer system 102 includes an initiation function 110 for initiating any or all applications in the system. The function 110 can be triggered during the execution of one application, for example through a user input by which a user "navigates" from the first application to a second application. When, say, an object 114 is displayed during execution of the first application, the user can navigate to the second application, as indicated by a navigation arrow 116, to have it perform a specific operation that relates to the object 114. Identification of the second application as the correct one may be based on both the object and the specific operation to be performed, optionally including other factors such as the user's role and the specific data included in the object.

The function 110 allows context data to be forwarded to the initiated application using a character string 112. Here, some or all of the context data will be represented by an address 118 that is included in the character string, the address providing the initiated application access to the context data.

Context data 119 may be stored in a memory 120 upon the user initiating the navigation 116. In some implementations, the first application is responsible for storing the applicable context data. The address 118 identifies the memory location of the context data. Upon receipt of the character string, the second application can parse the character string, read the address, and use the address to access the context data.

An exemplary operation of the system 100 includes:

(1) The system 100 receives a user input made with the user system 104 during execution of the first application 106. The user input requests a specific operation to be performed by the second application 108. The identity of the second application may or may not be uniquely determined at the time the input is made. Nevertheless, the specific operation is to be performed using the context data 119 from the first application.

(2) The system 100 stores, in response to the user input, the context data 119 in a memory location that is available during execution of the second application 108. For example, the memory 120 is a cache memory of the computer system 102.

(3) The system 100 forwards the character string 112 to the second application 108 upon its initiation, the character string including the address 118 of the memory location. The second application is then to access the context data 119 for performing the specific operation. For example, the specific operation results in a display of particular information in the user system 104.

In some implementations, the first and second applications are run by different computer devices.

Figure 2:
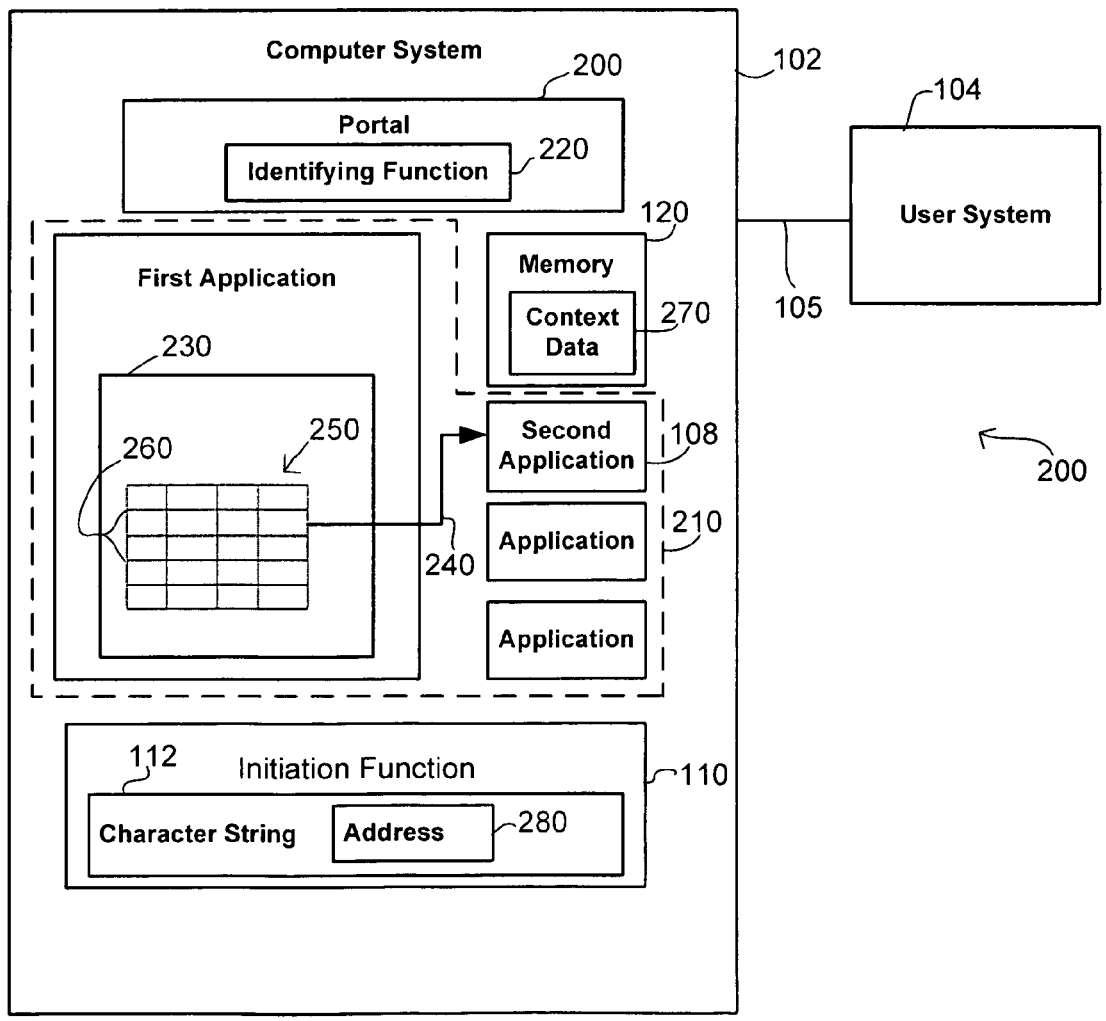
FIG. 2 shows another example of a system that forwards context data upon initiation of an application.

FIG. 2 shows a system 200 that includes the computer system 102 and the user system 104, and wherein the computer system 102 further includes a portal 200. The portal 200 may comprise a portal infrastructure for integrating various solutions and applications in the computer system 102. For example, the portal may provide knowledge management as well as integration of subsystems, tools, databases, documents and other content. In this example, the computer system 102 includes multiple applications 210, including the first and second applications described above, wherein some or all of the applications 210 may be integrated in the portal.

Particularly, the portal includes an identifying function 220 by which the portal can identify any of the applications 210 for the task of performing a specific operation. For example, the identifying function may access information that associates individual ones of the applications 210 with specific functions or actions, so that the correct application can be initiated. Another example is that when the specific operation relates to a particular information view 230 that can be displayed in the user system 104, the portal may identify a certain one of the applications that is associated with the view 230. Here, the information view 230 is shown inside the first application for clarity. Thus, upon the user initiating a navigation 240, the identifying function 220 can be used in identifying the right application to be initiated.

In some implementations, the information view 230 includes a table 250 containing data. For example, the table 250 is a result list that contains several representations of object instances, the instances resulting from a query that the user has performed in the system 200. The user now wishes to perform a specific operation regarding a few of the objects. The user therefore makes a selection 260 of one or more table entries in the table 250 using a pointing device. Here, the selection includes two table entries and is highlighted. The user makes the input that initiates the navigation 240, for example using a link displayed in the information view 230. In response, context data 270 that relates to the selection 260 is stored in the memory and an address 280 of the memory location is included in the character string 112. The character string is forwarded to the second application which can access the context data 270 using the address 280.

Figure 3:
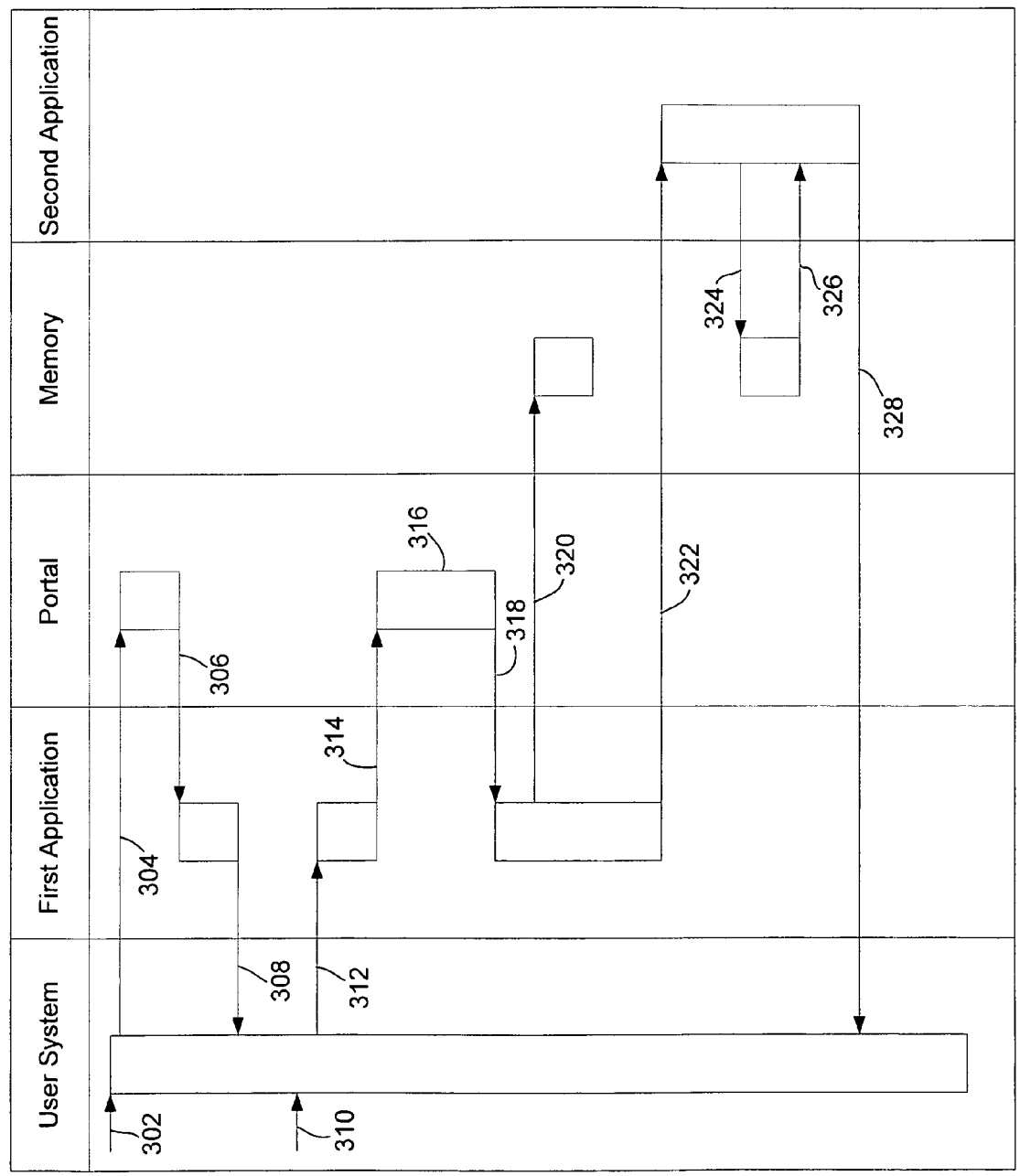
FIGS. 3 and 4 show flow diagrams of exemplary methods.
Figure 4:
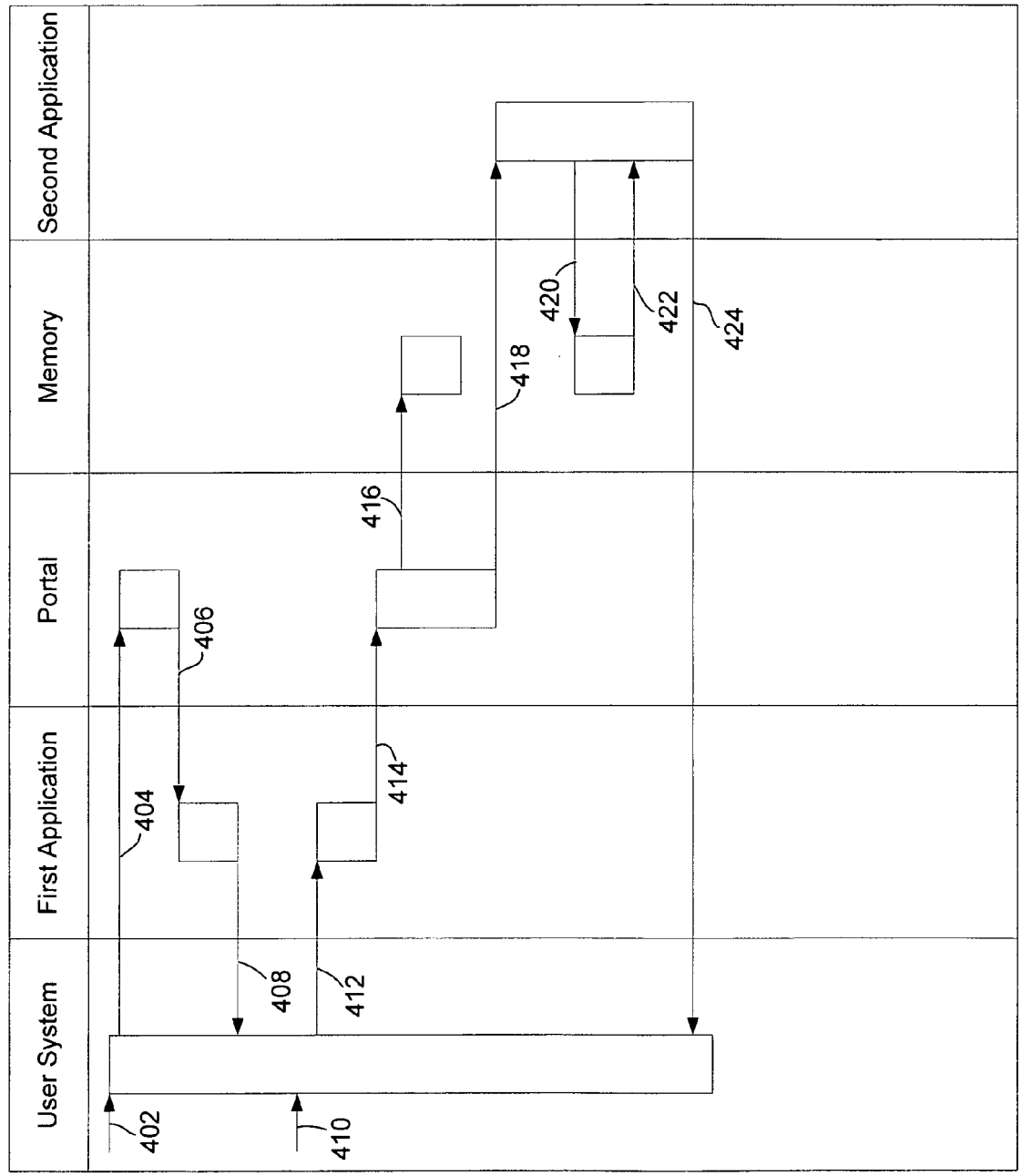

Exemplary operations of the system 200 will now be described with reference also to flow diagrams of a method 300 shown in FIG. 3 and a method 400 shown in FIG. 4. The method 300 or 400 can be performed using a computer program product, that is, by a processor executing instructions stored in a computer readable medium.

In the method 300, a user initiates the user system 104 by making an input 302. In the portal, a session for the user system may be initiated through a communication 304 over the connection 105. At 306, the portal initiates the first application using the initiation function 110, the application being selected by default or by the user. The first application generates an output, for example the information view 230, to the user system at 308. The information view allows the user to review certain data and initiate operations to be performed in the computer system 102. The user requests, through a user input 310, performance of a specific operation that requires the context data 270. The user input corresponds to initiating the navigation 240 and may follow upon the user making the selection 260. The first application may receive the user input at 312 and the portal may receive the user input at 314. In other implementations, the portal may receive the user input before, or in lieu of, the first application.

In method 300, the portal identifies the correct application for performing the specific operation, and the first application stores the context data in the memory location and initiates the second application. At 316, the portal identifies the second application among the applications 210 as being the correct one for performing the requested operation. The portal forwards this identity of the second application to the first application at 318. The first application stores the context data in the memory at 320, includes in the character string the address 280 of the memory location, and initiates the second application at 322. The first application uses the identity received from the portal to initiate the correct application. In other implementations, the first application may store the context data in the memory before receiving the identity of the second application from the portal.

The second application receives the character string 112 from the first application upon initiation or later. The second application parses the character string and reads the included address. At 324, the second application accesses the memory using the address, and retrieves the stored context data at 326. The second application thereafter performs the specific operation using the context data, which may result in an output to the user system at 328.

In method 400, in contrast, it is the portal that stores the context data in the memory and initiates the second application. Actions 402-412 may be identical or similar to the respective actions 302-312 described above. At 414, the first application forwards the context data to the portal, which in turn stores the context data in the memory at 416. Moreover, the portal identifies the second application using the identifying function 220 and initiates the application at 418. The second application receives the character string 112, parses it and reads the included address. Actions 420-424 may be identical or similar to the actions 324-328 described above.

The context data 119 or 270 may include many different types of information or data structures. For example, the context data may include a complex structure such as a Java object, or complex data such as XML code. That is, an advantage of using the address 118 or 280 in the character string is that the initiating function 110 can be used in providing also complex or extensive amounts of context data to the initiated application.

Other types of context data may be used in specific embodiments. For example, in an example relating to transfer of multimedia, the first application may transfer an identifier of a video recording that is to be presented; the second application may use the identifier to open and run the video recording.

Figure 5:
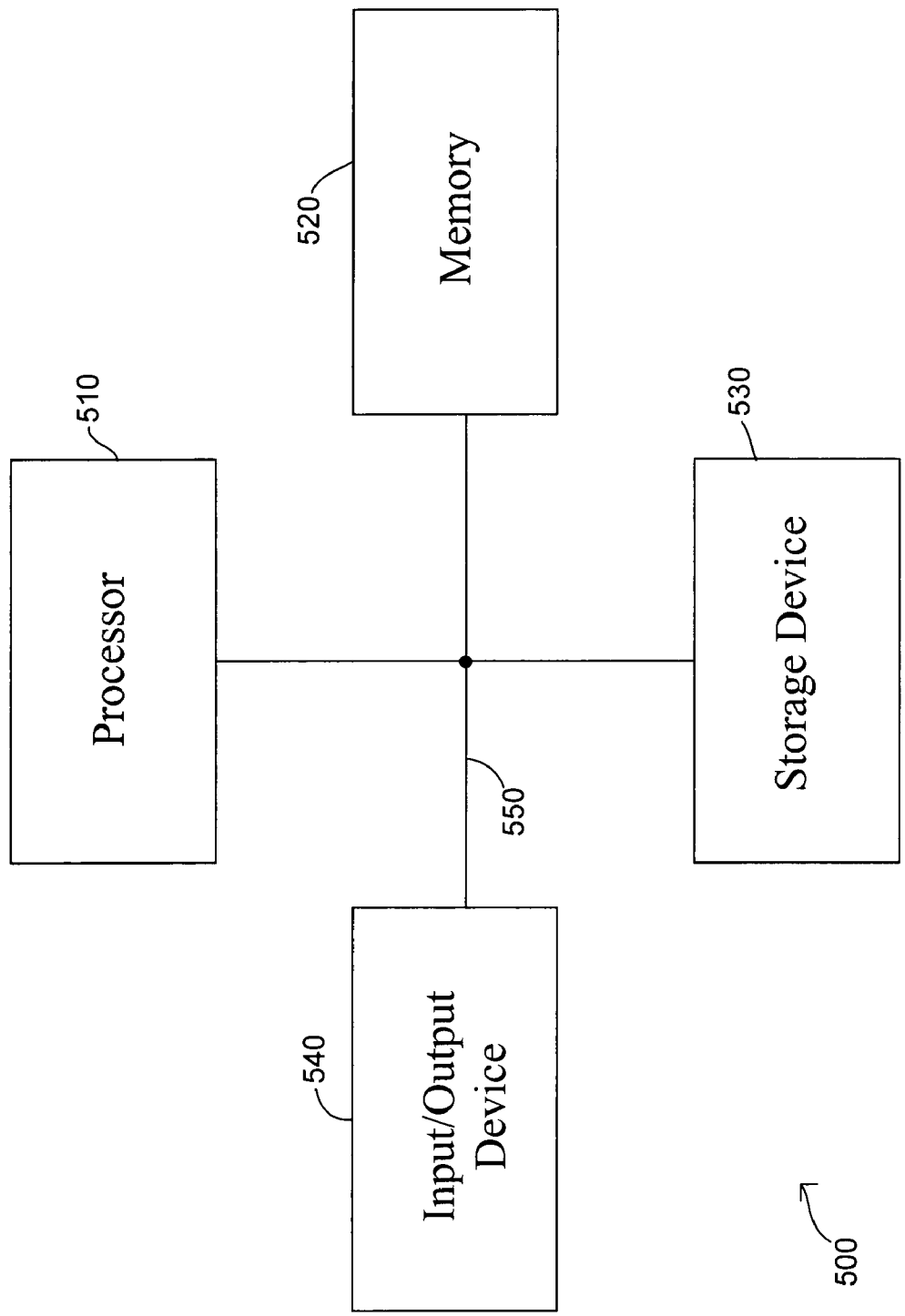
FIG. 5 is a block diagram of a general computer system.

FIG. 5 is a block diagram of a computer system 500 that can be used in the operations described above, for example in the computer system 102 or user system 104. The system 500 includes a processor 510, a memory 520, a storage device 530 and an input/output device 540. Each of the components 510, 520, 530 and 540 are interconnected using a system bus 550. The processor 510 is capable of processing instructions for execution within the system 500. In one embodiment, the processor 510 is a single-threaded processor. In another embodiment, the processor 510 is a multi-threaded processor. The processor 510 is capable of processing instructions stored in the memory 520 or on the storage device 530 to display graphical information for a user interface on the input/output device 540.

The memory 520 stores information within the system 500. In one embodiment, the memory 520 is a computer-readable medium. In one embodiment, the memory 520 is a volatile memory unit. In another embodiment, the memory 520 is a non-volatile memory unit.

The storage device 530 is capable of providing mass storage for the system 500. In one embodiment, the storage device 530 is a computer-readable medium. In various different embodiments, the storage device 530 may be a floppy disk device, a hard disk device, an optical disk device, or a tape device.

The input/output device 540 provides input/output operations for the system 500. In one embodiment, the input/output device 540 includes a keyboard and/or pointing device. In one embodiment, the input/output device 540 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:

generating, using a first application in a computer system and in response to a user query, a result list that contains multiple representations of object instances;

receiving a user input made during execution of the first application, the computer system having a function for initiating applications that allows context data to be forwarded to the initiated application in a character string, the user input requesting a specific operation to be performed by a second application, wherein the computer system includes a portal and several applications, and wherein the portal identifies, upon the user input being received, the second application from the several applications, the specific operation to be performed using the context data generated using the first application and held by the first application when the user input is received;

storing, in response to the user input, at least part of the result list as the context data, the context data comprising at least one of the representations of the object instances and being stored in a memory location that is available during execution of the second application; and forwarding the character string to the second application upon its initiation using the function, the character string including an address of the memory location, wherein the second application is to access the context data for performing the specific operation.

2. The method of claim 1, wherein the user input indicates a user selection of a table entry in the first application and wherein the context data comprises data from the selected table entry.

3. The method of claim 1, wherein the portal identifies the second application as being associated with an object on which the specific operation is to be performed.

4. The method of claim 1, wherein the first application provides the context data to the portal upon the user input being received and wherein the portal triggers the storing of the context data in the memory location.

5. The method of claim 4, wherein the portal triggers the initiation of the second application.

6. The method of claim 1, wherein the portal forwards an identity of the second application to the first application and wherein the first application triggers the initiation of the second application.

7. The method of claim 6, wherein the first application triggers the storing of the context data in the memory location.

8. The method of claim 1, wherein the second application parses the character string, reads the address and uses the address to access the context data.

9. A computer program product tangibly embodied in a computer-readable storage medium, the computer program product including instructions that, when executed, cause a processor to perform operations comprising:

generating, using a first application in a computer system and in response to a user query, a result list that contains multiple representations of object instances;

receiving a user input made during execution of the first application, the computer system having a function for initiating applications that allows context data to be forwarded to the initiated application in a character string, the user input requesting a specific operation to be performed by a second application, wherein the computer system includes a portal and several applications, and wherein the portal identifies, upon the user input being received, the second application from the several applications, the specific operation to be performed using the context data generated using the first application and held by the first application when the user input is received;

storing, in response to the user input, at least part of the result list as the context data, the context data comprising at least one of the representations of the object instances and being stored in a memory location that is available during execution of the second application; and forwarding the character string to the second application upon its initiation using the function, the character string including an address of the memory location, wherein the second application is to access the context data for performing the specific operation.

10. A computer system comprising:

several applications embodied in a computer-readable storage medium that can be executed for performing operations, including a first application operable to store a result list in response to a user query, the result list containing multiple representations of object instances;

a function embodied in a computer-readable storage medium for initiating any of the several applications, the function allowing context data comprising at least one of the representations of the object instances to be forwarded to the initiated application in a character string; and a portal that is embodied in a computer-readable storage medium and that, upon receipt of a user input made during execution of the first application, identifies a second application from the several applications for a specific operation requested by the user input, the second application to perform the specific operation using at least part of the result list as the context data, the context data generated using the first application and held by the first application when the user input is received, the first application providing the context data to the portal upon the user input being received;

wherein the character string is forwarded to the second application upon its initiation, the character string including an address of a memory location where the context data is stored, the portal triggering the storing of the context data in the memory location, the second application to use the address in accessing the context data for performing the specific operation.

11. The computer system of claim 10, wherein the user input indicates a user selection of a table entry in the first application and wherein the context data comprises data from the selected table entry.

12. The computer system of claim 10, wherein the portal identifies the second application as being associated with an object on which the specific operation is to be performed.

13. The computer system of claim 10, wherein the portal triggers the initiation of the second application using the function.

14. The computer system of claim 10, wherein the portal forwards an identity of the second application to the first application and wherein the first application triggers the initiation of the second application using the function.

15. The computer system of claim 10, wherein the second application parses the character string, reads the address and uses the address to access the context.

* * * * *